United States Patent
Mizutani et al.

(10) Patent No.: US 9,102,839 B1
(45) Date of Patent: Aug. 11, 2015

(54) PHOTOCURABLE INKJET PRINTING INK COMPOSITION, PRINTED MATTER AND MOLDED ARTICLE

(75) Inventors: Shinya Mizutani, Osaka (JP); Tadashi Hirose, Osaka (JP); Takuya Myose, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 25 days.

(21) Appl. No.: 14/240,012

(22) PCT Filed: Aug. 17, 2012

(86) PCT No.: PCT/JP2012/070912
§ 371 (c)(1),
(2), (4) Date: Jun. 23, 2014

(87) PCT Pub. No.: WO2013/027672
PCT Pub. Date: Feb. 28, 2013

(30) Foreign Application Priority Data

Aug. 23, 2011 (JP) ................. 2011-181412

(51) Int. Cl.
C09D 11/30 (2014.01)
C09D 11/107 (2014.01)
B41M 7/00 (2006.01)
B29C 43/00 (2006.01)
B41M 1/30 (2006.01)
C09D 11/101 (2014.01)
C09D 11/322 (2014.01)

(52) U.S. Cl.
CPC ............... C09D 11/30 (2013.01); B29C 43/00 (2013.01); B41M 1/30 (2013.01); B41M 7/0081 (2013.01); C09D 11/101 (2013.01); C09D 11/107 (2013.01); C09D 11/322 (2013.01)

(58) Field of Classification Search
CPC . C09D 11/101; C09D 11/322; B41M 7/0081; B41M 1/30; B29C 43/00
See application file for complete search history.

(56) References Cited

U.S. PATENT DOCUMENTS

2009/0117343 A1* 5/2009 Nishida et al. ............. 428/195.1
2009/0244116 A1* 10/2009 Ohnishi ........................... 347/6

FOREIGN PATENT DOCUMENTS

| JP | 2008-179810 A | 8/2008 |
|---|---|---|
| JP | 2010-144149 A | 7/2010 |
| JP | 2011-052107 A | 3/2011 |
| JP | 2012-007107 A | 1/2012 |
| JP | 2012-025910 A | 2/2012 |
| WO | WO 2007/013368 A1 | 2/2007 |

OTHER PUBLICATIONS

International Search Report issued by Japan Patent Office on Sep. 11, 2012 in the corresponding PCT Application No. PCT/JP2012/070912.

* cited by examiner

Primary Examiner — Betelhem Shewareged
(74) Attorney, Agent, or Firm — Knobbe, Martens, Olson & Bear LLP

(57) ABSTRACT

A photocurable inkjet printing ink composition includes at least a photopolymerizable compound component and a photopolymerization initiator, wherein in the photopolymerizable compound component, a monofunctional monomer is included in a content of 91.0 to 99.5% by mass and a multifunctional monomer is included in a content of 0.5 to 9.0% by mass; in the monofunctional monomer component, acryloylmorpholine is included in a content of 30.0 to 85.0% by mass; the monofunctional monomer component includes at least one selected from benzyl acrylate, ethyl carbitol acrylate, tetrahydrofurfuryl acrylate and phenoxyethyl acrylate in a content of 5.0 to 40.0% by mass in the monofunctional monomer component; and the stretching rate at 180° C. of the cured coating obtained by photopolymerizing the photocurable inkjet printing ink composition is 120% or more.

10 Claims, 1 Drawing Sheet

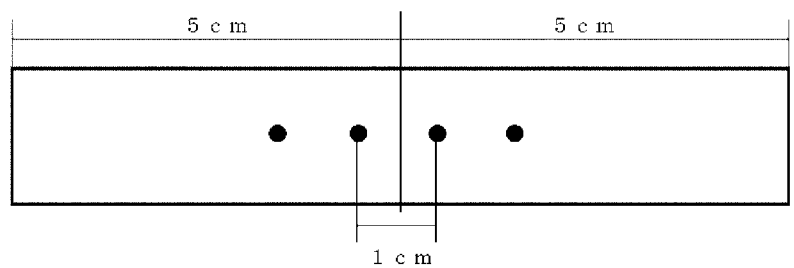
Central portion

PHOTOCURABLE INKJET PRINTING INK COMPOSITION, PRINTED MATTER AND MOLDED ARTICLE

This application is the U.S. National Phase under 35 U.S.C. §371 of International Application PCT/JP2012/070912, filed Aug. 17, 2012, which claims priority to Japanese Patent Application No. 2011-181412, filed Aug. 23, 2011. The International Application was published under PCT Article 21(2) in a language other than English.

TECHNICAL FIELD

The present invention relates to a photocurable inkjet printing ink composition, and a printed matter and a molded article printed with the same ink composition. More specifically, the present invention relates to a photocurable inkjet printing ink composition capable of forming a cured coating having satisfactory stretchability and satisfactory heat resistance, and satisfactory machinability even when a substrate is printed with the ink composition and then the substrate is thermally molded.

BACKGROUND ART

A photocurable ink is fast in drying and includes no volatile solvent, is free from the volatilization of a component hazardous to the environment, and has an excellent performance such as the capability of printing on various substrates; thus, photocurable inks are utilized, for example, in wide fields of various coatings and inkjet printing, in addition to the fields of offset printing, gravure printing, screen printing and letterpress printing. In particular, inkjet printing is capable of forming images simply and inexpensively without distinction of the materials or the shapes of the substrates, and hence is applied to various fields of usual printing of, for example, logotypes, graphics and photographic images, and also specific printing of, for example, marking and color filter. Inkjet printing is expected to yield more satisfactory printed matter, as a result of the effect due to combination with the performance of photocurable ink.

Recently, photocurable ink has come to be required to be also capable of printing, by an inkjet printing method, on substrates to be subsequently subjected to stretching or bending processing.

However, for such requirements, cured coatings of photocurable inks using conventional monofunctional monomers and multifunctional monomers frequently provide too high coating hardness. Accordingly, when stretching or bending processing is performed after the printing, cured coatings cannot follow the stretching or deformation of the substrates, and the adhesiveness of the cured coatings tend to be degraded, to lead to a problem such that the stretching and bending processability of the printed matter is lowered.

Accordingly, in order to solve these problems, for example, Patent Literature 1 proposes an active energy line-curable ink using a monofunctional monomer and a multifunctional monomer in combination, and including as a monofunctional monomer a monomer selected from a phenoxy group-containing (meth)acrylate, an ethylene oxide adduct of a phenoxy group-containing (meth)acrylate and a propylene oxide adduct of a phenoxy group-containing (meth)acrylate. Certainly, the active energy line-curable ink described in Patent Literature 1 is regarded to have a satisfactory stretchability, namely, a satisfactory ductility, but is clearly not an ink pursuing excellence in punching processability.

In this regard, the invention described in Patent Literature 2 is also the same as the invention in Patent Literature 1; although the invention of Patent Literature 2 is an invention to improve the high-temperature stretchability or the like of a photocurable inkjet printing ink composition on the premise of inclusion of urethane oligomer and isobornyl acrylate, nothing is pursued with respect to, for example, the punching processability of the cured ink composition.

However, recently a market demand for, for example, the capability of punching processing with punch or the like has grown. With respect to such a demand, in the case where a plastic sheet to be a printing substrate is thick and is hardly deformed and the shape of the hole to be drilled is as simple as a circle, a cutting processing such as drilling can also adopted, and hence such a processing is possible when the ink is sufficiently allowed to adhere to the printing substrate.

However, there occurs a problem that cutting processing takes very much labor and time, and is not adaptable to objects made of easily deformable materials. In contrast to this, punching processing is characterized by being capable of simply drilling a hole complicated in shape, and hence punching processing comes to be adopted as long as punching processing is applicable.

In this processing, the shear stress is instantaneously exerted on the portion to be punching-processed of the plastic sheet (printing substrate). Accordingly, the ink coating printed in the vicinity of the punching-processed portion is required to have a capability of instantaneously relaxing the shear stress so as to prevent the cracking of the coating or the exfoliation of the coating from the printing substrate.

However, even when the foregoing ink satisfactory in stretching and adhesion is used, the ink is not yet of a sufficient level in such a way that in the punching processing of a printed matter, the cracking or the exfoliation of the ink coating occurs in the punched cross section; as affairs now stand, there are no ink compositions capable of satisfying the performances required in the market such as the stretching and bending processability and the punching processability of the substrate.

Accordingly, as described in Patent Literature 3, a photocurable inkjet printing ink composition has been proposed which indispensably includes a urethane oligomer having an ethylenically unsaturated double bond and isobornyl acrylate. The ink composition indispensably includes a urethane oligomer different from a monomer, and is thereby capable of improving the punching processability. However, an accumulated irradiation amount of light energy of 300 mj is required to achieve the curing, and the curability is sometimes insufficient.

CITATION LIST

Patent Literature

Patent Literature 1: International Publication No. WO2007/013368
Patent Literature 2: Japanese Patent Laid-Open No. 2010-144149
Patent Literature 3: Japanese Patent Laid-Open No. 2011-052107

SUMMARY OF INVENTION

Technical Problem

Accordingly, the technical problem of the present invention is to provide a photocurable inkjet printing ink composition excellent in photocurability, and additionally, capable of forming a cured coating exhibiting no tackiness and having satisfactory stretchability and satisfactory heat resistance, and having satisfactory machinability even when the substrate is thermally molded.

Solution to Problem

The present inventors made a diligent study in order to solve the foregoing problems, and consequently have perfected the present invention by discovering that all the foregoing problems can be solved by including a monofunctional monomer in a specified amount in the photocurable inkjet printing ink composition and including in the monofunctional monomer acryloylmorpholine and a specific monofunctional monomer in specified amounts, even when in the substrate, a material such as polycarbonate resin, poor in adhesiveness to other polymers is utilized.

Specifically, the present invention relates to (1) a photocurable inkjet printing ink composition including at least a photopolymerizable compound component and a photopolymerization initiator, wherein in the photopolymerizable compound component, a monofunctional monomer is included in a content of 91.0 to 99.5% by mass and a multifunctional monomer is included in a content of 0.5 to 9.0% by mass; in the monofunctional monomer component, acryloylmorpholine is included in a content of 30.0 to 85.0% by mass; the monofunctional monomer component includes at least one selected from benzyl acrylate, ethyl carbitol acrylate, tetrahydrofurfuryl acrylate and phenoxyethyl acrylate in a content of 5.0 to 40.0% by mass in the monofunctional monomer component; and the stretching rate at 180° C. of the cured coating obtained by photopolymerizing the photocurable inkjet printing ink composition is 120% or more.

The present invention also relates to (2) the photocurable inkjet printing ink composition according to (1), further including a colorant.

The present invention also relates to (3) a printed matter obtained by forming a coating by printing the photocurable inkjet printing ink composition according to (1) or (2) on a substrate by an inkjet printing method and by curing the coating by photopolymerization.

The present invention also relates to (4) the printed matter according to (3), wherein the substrate is a plastic substrate made of at least one selected from polycarbonate, hard vinyl chloride, soft vinyl chloride, polyethylene, polyester, polypropylene and polystyrene.

The present invention also relates to (5) a molded article obtained by forming a coating by printing the photocurable inkjet printing ink composition according to (1) or (2) on a substrate by an inkjet printing method, by curing the coating by photopolymerization, and by subsequently thermally molding and/or machine processing the cured coating.

The present invention also relates to (6) the molded article according to (5), wherein the machine processing is punching processing.

Advantageous Effects of Invention

The photocurable inkjet printing ink composition of the present invention includes a specific photopolymerizable monomer and a photopolymerization initiator, and hence is excellent in photocurability, and capable of making satisfactory the heat resistance to the substrate and the cracking resistance of the ink coating after curing. Accordingly, the photocurable inkjet printing ink composition of the present invention can be suitably utilized without causing tackiness in the fields where machine processing is performed under harsher conditions, namely, in the fields of stretching and bending at high temperatures and additionally, punching processing, these fields having not hitherto been sufficiently coped with.

BRIEF DESCRIPTION OF DRAWING

FIG. 1 is a schematic diagram illustrating a method for evaluating a high-temperature stretchability.

DESCRIPTION OF EMBODIMENTS

Hereinafter, the photocurable inkjet printing ink composition (hereinafter, also simply referred to as "ink composition") of the present invention is specifically described.

<Photopolymerizable Compounds>

The photocurable inkjet printing ink composition of the present invention includes a plurality of types of photopolymerizable compounds.

The photopolymerizable compound component includes a monofunctional monomer component in a content of 91.0 to 99.5% by mass, preferably 91.4 to 99.4% by mass and more preferably 95.0 to 99.0% by mass in relation to the total amount of the plurality of types of the photopolymerizable compounds. The photopolymerizable compound component also includes a multifunctional monomer component in a content of 0.5 to 9% by mass, preferably 0.6 to 8.7% by mass and more preferably 1.0 to 5.0% by mass in relation to the total amount of the plurality of types of the photopolymerizable compounds. Further, in the monofunctional monomer component, acryloylmorpholine is included so as to have a content of 30.0 to 85.0% by mass, preferably 33.0 to 81% by mass and more preferably 50.0 to 70.0% by mass of the monofunctional monomer component; the monofunctional monomer component further includes at least one selected from benzyl acrylate, ethyl carbitol acrylate, tetrahydrofurfuryl acrylate and phenoxyethyl acrylate in a content of 5.0 to 40.0% by mass, preferably 5.5 to 35.0% by mass and more preferably 9 to 25% by mass of the monofunctional monomer component.

In addition to these, within a range not degrading the intended performances of the present invention, other monofunctional monomers may be included in order to improve other performances.

In addition to the foregoing monofunctional monomers, examples of the monofunctional monomer may include the following photopolymerizablle, ethylenical double bond-containing compounds: alkyl (meth)acrylates such as methyl methacrylate, butyl methacrylate, 2-ethylhexyl methacrylate, methyl acrylate, butyl acrylate and 2-ethylhexyl acrylate; aralkyl (meth)acrylates such as benzyl methacrylate; alkoxyalkyl (meth)acrylates such as butoxyethyl methacrylate, butoxyethyl acrylate and ethoxyethoxyethyl acrylate; (meth)acrylic acid esters of polyalkylene glycol monoalkyl ethers such as triethylene glycol monobutyl ether and dipropylene glycol monomethyl ether; (meth)acrylic acid esters of polyalkylene glycol monoaryl ethers such as hexaethylene glycol monophenyl ether; isobornyl (meth)acrylate; glycerol (meth)acrylate; 2-hydroxyethyl (meth)acrylate; photopolymerizable monomers such as N-vinylcaprolactam, epoxy (meth)acrylate, polyester (meth)acrylate, and photopolymerizable oligomers such as polyether (meth)acrylate; these can be used without being limited.

The content of acryloylmorpholine is preferably 30 to 85% by mass in the whole monofunctional monomer component in relation to the content of the whole monofunctional monomer component set to be 100% by mass. When the content of acryloylmorpholine is less than 30% by mass, the heat resistance tends to be decreased, and when the content of acryloylmorpholine exceeds 85% by mass, the punching processability tends to be decreased.

The monofunctional monomer preferably further includes at least one selected from benzyl acrylate, ethyl carbitol acrylate, tetrahydrofurfuryl acrylate and phenoxyethyl acrylate, in a content of 5 to 40% by mass in the monofunctional monomer component. When the content of the at least one monofunctional monomer selected from benzyl acrylate, ethyl carbitol acrylate, tetrahydrofurfuryl acrylate and phenoxyethyl acrylate is less than 5% by mass, the punching processability tends to be decreased, and when the content of the at least one monofunctional monomer selected from benzyl acrylate, ethyl carbitol acrylate, tetrahydrofurfuryl acrylate and phenoxyethyl acrylate exceeds 40% by mass, tack tends to occur.

Examples of the multifunctional monomer usable in the present invention include: 1,3-butylene glycol diacrylate, 1,4-butanediol diacrylate, diethylene glycol diacrylate, 1,6-hexanediol diacrylate, neopentylglycol diacrylate, polyethylene glycol diacrylate, tetraethylene glycol diacrylate, triethylene glycol diacrylate, tripropylene glycol diacrylate, ethoxylated bisphenol A diacrylate, cyclohexane dimethanol diacrylate, dipropylene glycol diacrylate, acrylate ester (dioxane glycol diacrylate), alkoxylated hexanediol diacrylate, alkoxylated cyclohexane dimethanol diacrylate, alkoxylated diacrylate, tricyclodecane dimethanol diacrylate, propoxylated neopentylglycol diacrylate, alkoxylated neopentylglycol diacrylate, alkoxylated aliphatic diacrylate, trimethylolpropane triacrylate, tris(2-hydroxyethyl) isocyanurate triacrylate, pentaerythritol triacrylate, ethoxylated trimethylolpropane triacrylate, propoxylated trimethylolpropane triacrylate, propoxylated glyceryl triacrylate, trimethylol propane trimetharylate, pentaerythritol tetraacrylate, ditrimethylol propane tetraacrylate, ethoxylated pentaerythritol tetraacrylate and dipentaerythritol pentaacrylate.

The content of the multifunctional monomer is preferably 0.5 to 9.0% by mass in relation to the total amount of the photopolymerizable compounds. When the content of the multifunctional monomer is less than 0.5% by mass, the heat resistance tends to be decreased. When the content of the multifunctional monomer exceeds 9.0% by mass, the cross-linking density comes to be too large, the cracking or the exfoliation of the coating occurs, and the stretchability tends to be decreased.

<Photopolymerization Initiator>

The photocurable inkjet printing ink composition of the present invention includes a photopolymerization initiator.

The photopolymerization initiator is preferably of a molecular cleavage type or of a hydrogen abstraction type.

Specific examples of the photopolymerization initiator include: benzoin isobutyl ether, 2,4-diethyl thioxanthone, 2-isopropylthioxanthone, benzil, 2,4,6-trimethylbenzoyl-diphenylphosphine oxide, 2-benzyl-2-dimethylamino-1-(4-morpholinophenyl)-butan-1-one, bis(2,4,6-dimethoxybenzoyl)-2,4,4-trimethylpentylphosphine oxide, 1,2-octanedione, 1-hydroxycyclohexyl phenyl ketone, benzoin ethyl ether, benzil dimethyl ketal, 2-hydroxy-2-methyl-1-phenylpropan-1-one, 1-(4-isopropylphenyl)-2-hydroxy-2-methylpropan-1-one, benzophenone, 4-methyl benzophenone, isophthalic phenone, 4-benzoyl-4'-methyl-diphenyl sulfide, 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, 2,4-trichloromethyl(4'-methoxystyryl)-6-triazine and 2,4,6-trichloro-s-triazine. These can be used each alone or in combinations of two or more thereof.

When the ink composition of the present invention does not include the below-described sensitizer, the content of the photopolymerization initiator is preferably 5 to 20% by mass and more preferably 5 to 13% by mass in the photocurable inkjet printing ink composition. When the content of the photopolymerization initiator is less than 5% by mass, the curability to the active energy line is sometimes not sufficient. When the content of the photopolymerization initiator exceeds 20% by mass, no improvement effect is found, unpreferably leading to excessive addition of the photopolymerization initiator.

The content of the photopolymerization initiator in the case where the ink composition of the present invention includes the below-described sensitizer is preferably 3.5 to 20% by mass and more preferably 3.5 to 13% by mass in the photocurable inkjet printing ink composition.

<Sensitizer>

The photocurable inkjet printing ink composition of the present invention may also further include a sensitizer (compound) for the purpose of improving the curability.

Examples of the sensitizer include: trimethylamine, methyl dimethanol amine, triethanolamine, p-diethylaminoacetophenone, ethyl p-dimethylaminobenzoate, isoamyl p-dimethylaminobenzoate, N,N-dimethylbenzylamine, 9,10-dibutoxyanthracene, 9,10-diethoxyanthracene, 9,10-dipropoxyanthracene, 9,10-bis(2-ethylhexyloxy)anthracene, 2,4-diethylthioxanthone, 2-isopropylthioxanthone and 4-isopropylthioxanthone.

The content of the sensitizer is preferably in a range from 0 to 3% by mass and more preferably in a range from 0.5 to 2% by mass in the photocurable inkjet printing ink composition. When the content of the sensitizer exceeds 3% by mass, no improvement effect is found, unpreferably leading to excessive addition of the sensitizer.

<Colorant>

The photocurable inkjet printing ink composition of the present invention may also include, if necessary, a colorant.

As the colorant, the colorants having hitherto been used in photocurable inkjet printing ink compositions can be used without being particularly limited; however, an organic pigment or an inorganic pigment to be satisfactorily dispersed in the ink composition and excellent in lightfastness is preferable.

Specific examples of the organic pigment include: dye lake pigments, and azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, anthraquinone-based, flavanthrone-based, quinophthalone-based, pyranthrone-based and indanthrone-based pigments.

Specific examples of the inorganic pigment include: carbon black, titanium oxide, colcothar, black lead, iron black, chrome oxide green and aluminum hydroxide.

The content of the colorant is preferably 1 to 20% by mass in the photocurable inkjet printing ink composition. When the content of the colorant is less than the foregoing range, the image quality of the resulting printed matter tends to be degraded, and on the other hand, when the content of the colorant exceeds the foregoing range, the viscosity property of the photocurable inkjet printing ink composition tends to be adversely affected.

When a pigment is used as the colorant, the photocurable inkjet printing ink composition of the present invention preferably includes a pigment dispersant, for the purpose of improving the dispersibility of the pigment and the storage stability of the ink composition.

As the pigment dispersant, well-known pigment dispersants having hitherto been used in the field of the ink composition are not particularly limited; however, among others, polymer dispersants are preferable.

Examples of the polymer dispersant include: a carbodiimide-based dispersant, a polyester amine-based dispersant, a fatty acid amine-based dispersant, a modified polyacrylate-based dispersant, a modified polyurethane-based dispersant, a poly-chain polymeric nonionic dispersant, and a polymeric ionic surfactant. These pigment dispersants can be used each alone or as mixtures of two or more thereof.

The content of the pigment dispersant usually preferably 1 to 200 parts by mass and more preferably 1 to 60 parts by mass in relation to 100 parts by mass of the whole pigments in the photocurable inkjet printing ink composition. When the content of the pigment dispersant is less than 1 part by mass, there is an adverse possibility that the pigment dispersibility and the storage stability of the ink composition are degraded; on the other hand, although the pigment dispersant can be included in a content exceeding 200 parts by mass, the effect difference is sometimes not found.

<Solvent>

The photocurable inkjet printing ink composition of the present invention may also include, if necessary, a solvent.

The boiling point of the solvent is preferably 150 to 220° C. at normal pressure ($1.013 \times 10^2$ kPa).

Specific examples of the solvent may include an ester-based organic solvent, an ether-based organic solvent, an ether ester-based organic solvent, a ketone-based organic solvent, an aromatic hydrocarbon solvent, and a nitrogen-containing organic solvent. However, from the viewpoint of the curability of the ink composition, environment issues and the like, it is preferable not to use organic solvents to the utmost.

The content of the solvent is preferably 5% by mass or less, more preferably 2% by mass or less and particularly preferably 0% by mass in the ink composition.

<Other Additives>

The photocurable inkjet printing ink composition of the present invention may also include, if necessary, various additives for the purpose of developing various functionalities.

Specific examples of such additives include: a thermosetting resin, a light stabilizer, a surface treatment agent, a surfactant, a viscosity-lowering agent, an antioxidant, an antiaging agent, a cross-linking promoter, a polymerization inhibitor, a plasticizer, a preservative, a pH adjuster, an antifoaming agent and a moisturizing agent.

Method for Preparing Ink Composition

The method for preparing the photocurable inkjet printing ink composition of the present invention is not particularly limited, and the ink composition can be prepared by adding all the foregoing materials and mixing the materials with a bead mill, a triple roll mill or the like. When a pigment is used, the ink composition can also be prepared as follows: the pigment, the pigment dispersant and the photopolymerizable compound are mixed to beforehand prepare a concentrated base ink, and the remaining components of the foregoing components are added to the concentrated base so as to obtain the intended composition to prepared the ink composition.

Properties of Ink Composition (1) Stretching Rate of Cured Coating of Ink Composition In the ink composition of the present invention, for the purpose of enabling stretching and bending processing under heating, the stretching rate, at 180° C., of the cured coating obtained by photopolymerizing the ink composition is preferably 120% or more and more preferably 150% or more.

The stretching rate of the cured coating of the ink composition means the stretching rate measured by the following method.

(Measurement Method of Stretching Rate)

A polycarbonate plate (thickness: 0.5 mm) is coated with the ink composition by using a #12 bar coater to form a coating having a thickness of 20 μm. By applying an UV lamp (Z-8 lamp) manufactured by Heraeus as an irradiation device to the coating, the coating is cured until the coating is completely cured under the irradiation conditions of 120 W/cm× 23 m/min and a distance of 10 cm (accumulated amount of light per one pass: 60 mJ/cm$^2$). After the curing, the cured coating is cut out to a size of 2 cm×10 cm to prepare a measurement specimen, the measurement specimen is stretched with a tensile tester in an environment of 180° C. at a tensile rate of 50 mm/min, and the stretching rate is measured on the basis of the length with which the cured coating can be stretched without causing cracking.

As illustrated in FIG. 1, when the distance between the central black dots marked so as to place therebetween the center of the measurement specimen is changed to X cm from the distance before the stretching of 1 cm, the stretching rate is defined by $\{(X-1)/1\} \times 100$ [%].

(2) Viscosity

In the ink composition of the present invention, the viscosity at 25° C. is preferably 5 to 70 mPa·s, for example, from the viewpoint of obtaining a satisfactory ink ejection performance and a thick printed coating.

In present Description, the viscosity at 25° C. is a value measured with a B type viscometer (trade name: Model RE100L Viscometer, manufactured by Toki Sangyo Co., Ltd.).

Production of Printed Matter

Next, the printed matter obtained by using the photocurable inkjet printing ink composition of the present invention is described.

The substrate on which the photocurable inkjet printing ink composition of the present invention is printed is not particularly limited as long as the substrate is a heretofore known substrate (such as a plastic substrate, paper, capsule, gel, metal foil, glass, wood and cloth) to which an ultraviolet light curable inkjet printing ink composition is applicable. Among others, the substrate is preferably a plastic substrate made of a least one selected from polycarbonate, hard vinyl chloride, soft vinyl chloride, polyethylene, polyester, polypropylene and polystyrene.

Next, specific examples of the method for printing and curing the ink composition of the present invention include a method in which after the ink composition of the present invention is ejected onto a substrate, the ink composition landing on the substrate is cured by exposure to light.

Specifically, for example, the ejection onto the substrate (image printing) can be performed by feeding the ink composition of the present invention to the printer head of an inkjet recording-type printer, and by ejecting the ink composition from the printer head onto a recording material so as for the thickness of the coating to be 1 to 20 μm. The exposure to light and curing (curing of image) can be performed by irradiating with light the ink composition applied as an image to the recording material.

As the inkjet recording-type printer for printing the ink composition of the present invention, inkjet recording-type printers having hitherto been used can be utilized. When a continuous-type inkjet recording printer is used, it is preferable to regulate the electric conductivity of the ink composition by further adding an electric conductivity imparting agent to the ink composition.

Examples of the light source in the image curing may include: ultraviolet light, electron beam, visible light and light-emitting diode (LED).

The printed matter is also an aspect of the present invention which is produced, as described above, by printing the photocurable inkjet printing ink composition of the present invention on a substrate by an inkjet printing method to form a coating, and by curing the coating by photopolymerization to from a printed matter.

Production of Molded Article

The printed matter obtained by the foregoing method can be suitably utilized in the field in which subsequently to the production of the printed matter, various machine processings such as stretching and bending processing, punching processing or cutting processing of the printed matter is performed. Examples of the method of machine processing such as stretching and bending processing or punching processing include: various common methods such as stretching by using a conventional stretching apparatus, and press processing or cutting processing using a die having a predetermined shape under heating or non-heating.

Due to the synergistic effect between the inkjet printing method readily realizing decorative printing and the capabilities of the cured coating of the ink composition of the present invention, photocurable, excellent in adhesion to the substrate, stretchability, heat resistance and various processing suitabilities, printed matter can be obtained easily and beautifully, and additionally, the resulting printed matter can be suitably subjected to stretching and bending processing even under harsher conditions, ranging from low temperatures leading to thermal energy saving to high temperatures facilitating thermal molding processing. Moreover, even when the printed matter is subjected to machine processing such as punching processing, the cracking or the exfoliation of the cured coating does not occur, and the printed matter can be processed into an intended shape while the excellent printing quality of the printed matter is being maintained.

The molded article also falls within the scope of the present invention which is obtained, as described above, by forming a coating by printing the photocurable inkjet printing ink composition of the present invention on a substrate by the inkjet printing method, by curing the coating by photopolymerization, and by subsequently subjecting the cured coating to molding such as punching processing.

EXAMPLES

Hereinafter, the present invention is described in more detail with reference to Examples; however, the present invention is not limited only to these Examples.

The materials used in following Examples and Comparative Examples are as follows.

<Pigment Dispersant>
Ajisper PB821 (manufactured by Ajinomoto Co., Inc.)
<Photopolymerizable Compounds>
ACMO: Acryloylmorpholine (manufactured by Kohjin Co., Ltd.)
V160: Benzyl acrylate (manufactured by Osaka Organic Chemical Ind., Ltd.)
V190: Ethyl carbitol acrylate (manufactured by Osaka Organic Chemical Ind., Ltd.)
SR285: Tetrahydrofurfuryl acrylate (manufactured by Sartomer Co., Inc.)
SR339A: Phenoxyethyl acrylate (manufactured by Sartomer Co., Inc.)
SR368: Tris(2-hydroxyethyl) isocyanurate triacrylate (manufactured by Sartomer Co., Inc.)
CD9038: Ethoxylated bisphenol A diacrylate (manufactured by Sartomer Co., Inc.)
HDDA: 1,6-hexanediol diacrylate (manufactured by Daicel-Cytec Co., Ltd.)
IBXA: Isobornyl acrylate (manufactured by Osaka Organic Chemical Ind., Ltd.)
<Photopolymerization Initiators and Sensitizer>
TPO: 2,4,6-Trimethylbenzoyldiphenylphosphine oxide (manufactured by Lamberti Inc.)
DETX: Diethyl thioxanthone (manufactured by Sieber Hagner & Co. AG)
Ir184D: α-Hydroxycyclohexyl-phenylketone (manufactured by Ciba Specialty Chemicals Inc.)
<Additives>
UV-5: Dioctyl maleate (manufactured by Kuromakemu Co., Ltd.)
SK Resin (manufactured by Evonik Gegussa GmbH)

Examples 1 to 8 and Comparative Examples 1 to 6

Preparation of Concentrated Base for Photocurable Inkjet Printing Ink Composition (Pigment Dispersion Base)

A pigment dispersion base was obtained by dispersing a mixture prepared by mixing a pigment (pigment blue 15:4), a pigment dispersant (Ajisper PB821, manufactured by Ajinomoto Co., Inc.) and isobornyl acrylate so as to have a mixing ratio (mass ratio) of 20/8/72, by using an Eiger mill (as media, zirconia beads of 0.5 mm in diameter were used).

<Preparation of Photocurable Inkjet Printing Ink Composition>

The photocurable inkjet printing ink composition of each of Examples 1 to 8 and Comparative Examples 1 to 6 was obtained by using the pigment dispersion base obtained above, and by mixing the involved ingredients so as to have the composition (% by mass) given in Table 1. The viscosities of the obtained photocurable inkjet printing ink compositions were found to be 5 to 70 mPa·s (25° C.)

<Printing of Photocurable Inkjet Printing Ink Compositions>

In an inkjet recording apparatus equipped with piezoelectric inkjet nozzles, the photocurable inkjet printing ink composition of each of Examples 1 to 8 and Comparative Examples 1 to 6 was filled, and continuously printed on a polyethylene sheet (trade name: ECOS, manufactured by Interwrap, Inc.) and a polyester film (trade name: Toyobo ester film E5101, manufactured by Toyobo Co., Ltd., thickness: 100 μm) to obtain an images on each of the polyethylene sheet and the polyester film. For each of the photocurable inkjet printing ink compositions, the ejection performance was satisfactory, and an image having a predetermined ink coating thickness (10 μm) was obtained.

[Performance Evaluation of Photocurable Inkjet Printing Ink Compositions]

Each of the photocurable inkjet printing ink compositions obtained in Examples 1 to 8 and Comparative Examples 1 to 6 was applied to a polycarbonate plate (thickness: 0.5 mm) with a #12 bar coater, and then cured by using an UV lamp (Z-8 lamp) manufactured by Heraeus to form a cured coating (thickness: 20 µm). The high-temperature stretchability, the heat resistance, the punching processability and the curability of each of the cured coatings formed on the polycarbonate plate substrate were evaluated by the following methods, and the results thus obtained are shown in Table 1.

(High-Temperature Stretchability)

Each of the cured coatings (substrate: polycarbonate plate) was cut out to a size of 2 cm×10 cm to prepare a measurement specimen, the measurement specimen was heated to 180° C. and stretched with a tensile tester at a tensile rate of 50 mm/min; as illustrated in FIG. 1, when the distance between the central black dots marked so as to place therebetween the center of the measurement specimen was changed to 2.2 cm by stretching from the distance before the stretching of 1 cm, the state of the cured coating was visually examined to evaluate the high-temperature stretchability.

○: The case where the cured coating is free from cracking.
x: The case where the cured coating has cracking.

(Heat Resistance)

On each of the cured coatings (substrate: polycarbonate plate), a cut is formed with a cutter knife, and each of the cured coatings was allowed to stand under the conditions of a temperature of 85° C. and a humidity of 85% for 1 week, and then the heat resistance of each of the cured coatings was evaluated by visually examining the change of the cut.

○: The case where no change of the cut is found.
Δ: The case where some change of the cut is found, but the change of the cut is of the level of no problem in practical use.
x: The case where the cut is found to be changed.

(Punching Processability)

Each of the cured coatings (substrate: polycarbonate plate) was punched with a punch (No. 420, manufactured by PLUS Corp.), and the state of the resulting cut face was visually examined to evaluate the punching processability of each of the cured coatings.

○: The case where no cracking of the coating is found on the cut face.
Δ: The case where the cracking of the coating is found partially on the cut face.
x: The case where the cracking/exfoliation of the coating is found to be serious on the cut face.

(Tack)

Each of the cured coatings (substrate: polycarbonate plate) was touched with a finger, and the state of the coating surface was visually examined to evaluate the tack of each of the cured coatings.

○: The case where no fingerprint is marked on the coating.
x: The case where a fingerprint is marked on the coating.

(Curability)

The curability of each of the ink compositions obtained in Examples and Comparative Examples was evaluated on the basis of the accumulated irradiation energy used to complete the curing by using the UV lamp (Z-8 lamp) manufactured by Heraeus, under the irradiation conditions of 120 W/cm×23 m/min and a distance of 10 cm (accumulated amount of light per one pass: 60 mJ/cm$^2$). The determination of the curing was performed by visually verifying whether or not the cured coating was rubbed off by rubbing the coating with a cotton bud.

TABLE 1

| Composition | | Examples | | | | | | | | Comparative Examples | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| (a) Pigment dispersion base including 72% by mass (8.6 parts by mass) of IBXA | | 12.0 | 12.0 | 12.0 | 12.0 | 12.0 | 12.0 | 12.0 | 12.0 | 12.0 | 12.0 | 12.0 | 12.0 | 12.0 | 12.0 |
| (b) Monofunctional monomers | ACMO (Acryloyl-morpholine) | 30.0 | 70.0 | 60.0 | 60.0 | 60.0 | 60.0 | 64.0 | 55.0 | 20.0 | 78.0 | 51.5 | 38.0 | 60.0 | 60.0 |
| | V160 | 30.0 | 8.0 | — | — | — | — | 8.0 | — | 30.0 | — | — | — | — | 19.2 |
| | V190 | — | — | 18.0 | — | — | 5.0 | — | 5.0 | — | — | 18.0 | 40.0 | — | — |
| | SR285 | — | — | — | 18.0 | — | — | — | — | — | — | — | — | — | — |
| | SR339A | — | — | — | — | 18.0 | — | — | — | — | — | — | — | — | — |
| | IBXA | 19.0 | — | — | — | — | 13.0 | — | 13.0 | 29.0 | — | — | — | 18.0 | — |
| (c) Multifunctional monomers | SR368 | 0.5 | — | — | — | — | — | — | — | 0.5 | — | — | — | — | — |
| | CD9038 | — | — | — | — | — | — | 7.5 | — | — | — | — | — | — | — |
| | HDDA | — | 1.5 | 1.5 | 1.5 | 1.5 | 1.5 | — | 1.5 | — | 1.5 | 10 | 1.5 | 1.5 | 0.3 |
| Photopolymerization initiators and sensitizer | TPO | 4.5 | 4.5 | 4.5 | 4.5 | 4.5 | 4.5 | 4.5 | 4.5 | 4.5 | 4.5 | 4.5 | 4.5 | 4.5 | 4.5 |
| | DETX | 1.0 | 1.0 | 1.0 | 1.0 | 1.0 | 1.0 | 1.0 | 1.0 | 1.0 | 1.0 | 1.0 | 1.0 | 1.0 | 1.0 |
| | Ir184D | 2.0 | 2.0 | 2.0 | 2.0 | 2.0 | 2.0 | 2.0 | 2.0 | 2.0 | 2.0 | 2.0 | 2.0 | 2.0 | 2.0 |
| Additives | UV-5 | 1.0 | 1.0 | 1.0 | 1.0 | 1.0 | 1.0 | 1.0 | 1.0 | 1.0 | 1.0 | 1.0 | 1.0 | 1.0 | 1.0 |
| | SK Resin | — | — | — | — | — | — | — | 5.0 | — | — | — | — | — | — |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 |
| ((a) + (b))/L(a) + (b) + (c)) (%) | | 99.4 | 98.3 | 98.3 | 98.3 | 98.3 | 98.3 | 91.5 | 98.2 | 99.4 | 98.3 | 88.6 | 98.3 | 98.3 | 99.7 |
| (c)/L(a) + (b) + (c)) (%) | | 0.6 | 1.7 | 1.7 | 1.7 | 1.7 | 1.7 | 8.5 | 1.8 | 0.6 | 1.7 | 11.4 | 1.7 | 1.7 | 0.3 |
| ACMO/((a) + (b)) (%) | | 34.2 | 80.8 | 69.3 | 69.3 | 69.3 | 69.3 | 79.4 | 68.7 | 22.8 | 90.1 | 65.9 | 43.9 | 69.3 | 68.3 |
| (V160 + V190 + SR285 + SR339A)/((a) + (b)) (%) | | 34.2 | 9.2 | 20.8 | 20.8 | 20.8 | 5.8 | 9.9 | 6.2 | 34.2 | 0.0 | 23.0 | 46.2 | 0 | 21.9 |
| Evaluations | | | | | | | | | | | | | | | |
| High-temperature stretchability (○: >120%) | | ○ | ○ | ○ | ○ | ○ | ○ | ○ | ○ | ○ | ○ | x | ○ | ○ | ○ |
| Heat resistance | | ○ | ○ | ○ | ○ | ○ | ○ | ○ | ○ | x | ○ | ○ | ○ | ○ | x |
| Punching processability | | ○ | ○ | ○ | ○ | ○ | ○ | ○ | ○ | ○ | x | ○ | ○ | x | ○ |
| Tack | | ○ | ○ | ○ | ○ | ○ | ○ | ○ | ○ | ○ | ○ | ○ | x | ○ | x |
| Curability | | 100 | 100 | 100 | 100 | 100 | 100 | 100 | 100 | 100 | 200 | 100 | 100 | 100 | 100 |
| Whole monomers (a) + (b) + (c) | | 88.1 | 88.1 | 88.1 | 88.1 | 88.1 | 88.1 | 88.1 | 81.6 | 88.1 | 88.1 | 88.1 | 88.1 | 88.1 | 88.1 |
| Monofunctional monomers (a) + (b) | | 87.6 | 86.6 | 86.6 | 86.6 | 86.6 | 86.6 | 80.6 | 80.1 | 87.6 | 86.6 | 78.1 | 86.6 | 86.6 | 87.8 |

TABLE 1-continued

| | Examples | | | | | | | | Comparative Examples | | | | | |
|---|---|---|---|---|---|---|---|---|---|---|---|---|---|---|
| Composition | 1 | 2 | 3 | 4 | 5 | 6 | 7 | 8 | 1 | 2 | 3 | 4 | 5 | 6 |
| Multifunctional monomer (c) | 0.5 | 1.5 | 1.5 | 1.5 | 1.5 | 1.5 | 7.5 | 1.5 | 0.5 | 1.5 | 10 | 1.5 | 1.5 | 0.3 |
| ACMO | 30 | 70 | 60 | 60 | 60 | 60 | 64 | 55 | 20 | 78 | 51.5 | 38 | 60 | 60 |
| V160 + V190 + SR285 + SR339A | 30 | 8 | 18 | 18 | 18 | 5 | 8 | 5 | 30 | 0 | 18 | 40 | 0 | 19.2 |

According to the results of Examples 1 to 8, it can be seen that by printing with the ink composition of the present invention, there can be achieved the effects such that the printed portion is excellent in the high-temperature stretchability, the heat resistance, the punching processability and the curability, and does not exhibit tack. The accumulated amount of the irradiation energy required for the curing is as low as 100 mJ/cm$^2$, and it is possible to rapidly perform the step of curing.

On the contrary, in the ink composition of Comparative Example 1, the content of acryloylmorpholine in the monofunctional monomer component was as low as 22.8% by mass, the resulting printed portion had no sufficient heat resistance, and the irradiation energy required for curing the printed portion was increased. Conversely, as the case of Comparative Example 2, the case where the content of acryloylmorpholine in the monofunctional monomer component is large, and the content of a specific monofunctional monomer (at least one selected from benzyl acrylate, ethyl carbitol acrylate, tetrahydrofurfuryl acrylate and phenoxyethyl acrylate) is small results in a poor punching processability.

As in Comparative Example 4, in the case where the content of the specific monofunctional monomer (at least one selected from benzyl acrylate, ethyl carbitol acrylate, tetrahydrofurfuryl acrylate and phenoxyethyl acrylate) was too large, the occurrence of tack resulted.

As shown in Comparative Example 3, in the case where the content of the monofunctional monomer in the photopolymerizable compound component was small and the content of the multifunctional monomer was large, the high-temperature stretchability was degraded.

Conversely, as in Comparative Example 6, in the case where the content of the monofunctional monomer in the photopolymerizable compound component is large, and the content of the multifunctional monomer is small, the decrease of the heat resistance results.

Moreover, as Comparative Example 5 shows, in the case where even when the content of acryloylmorpholine in the monofunctional monomer component was appropriate, the content of the specific monofunctional monomer (at least one selected from benzyl acrylate, ethyl carbitol acrylate, tetrahydrofurfuryl acrylate and phenoxyethyl acrylate) was small, a poor punching processability resulted as in the case of Comparative Example 2.

According to these results, when even at least one of the features constituting the ink composition of the present invention is not fulfilled, all the above-described effects cannot be achieved.

INDUSTRIAL APPLICABILITY

The photocurable inkjet printing ink composition of the present invention is excellent in photocurability, is capable of making satisfactory the heat resistance to the substrate and the cracking resistance of the ink coating after curing, and hence can be suitably utilized in the fields where machine processing is performed under harsher conditions, namely, in the fields of stretching and bending at high temperatures and additionally, punching processing with a punch.

The invention claimed is:

1. A photocurable inkjet printing ink composition comprising at least a photopolymerizable compound component and a photopolymerization initiator,
    wherein in the photopolymerizable compound component, a monofunctional monomer is included in a content of 91.0 to 99.5% by mass and a multifunctional monomer is included in a content of 0.5 to 9.0% by mass;
    in the monofunctional monomer component, acryloylmorpholine is included in a content of 30.0 to 85.0% by mass;
    the monofunctional monomer component includes at least one selected from benzyl acrylate, ethyl carbitol acrylate, tetrahydrofurfuryl acrylate and phenoxyethyl acrylate in a content of 5.0 to 40.0% by mass in the monofunctional monomer component; and
    the stretching rate at 180° C. of the cured coating obtained by photopolymerizing the photocurable inkjet printing ink composition is 120% or more.

2. The photocurable inkjet printing ink composition according to claim 1, further comprising a colorant.

3. A printed matter obtained by forming a coating by printing the photocurable inkjet printing ink composition according to claim 1 on a substrate by an inkjet printing method and by curing the coating by photopolymerization.

4. The printed matter according to claim 3, wherein the substrate is a plastic substrate made of at least one selected from polycarbonate, hard vinyl chloride, soft vinyl chloride, polyethylene, polyester, polypropylene and polystyrene.

5. A molded article obtained by forming a coating by printing the photocurable inkjet printing ink composition according to claim 1 on a substrate by an inkjet printing method, by curing the coating by photopolymerization, and by subsequently thermally molding and/or machine processing the cured coating.

6. The molded article according to claim 5, wherein the machine processing is punching processing.

7. A printed matter obtained by forming a coating by printing the photocurable inkjet printing ink composition according to claim 2 on a substrate by an inkjet printing method and by curing the coating by photopolymerization.

8. The printed matter according to claim 7, wherein the substrate is a plastic substrate made of at least one selected from polycarbonate, hard vinyl chloride, soft vinyl chloride, polyethylene, polyester, polypropylene and polystyrene.

9. A molded article obtained by forming a coating by printing the photocurable inkjet printing ink composition according to claim 2 on a substrate by an inkjet printing method, by curing the coating by photopolymerization, and by subsequently thermally molding and/or machine processing the cured coating.

10. The molded article according to claim 9, wherein the machine processing is punching processing.

* * * * *